(12) United States Patent
Kim et al.

(10) Patent No.: US 12,541,007 B2
(45) Date of Patent: Feb. 3, 2026

(54) SPATIAL LIGHT MODULATOR AND LiDAR APPARATUS INCLUDING THE SAME

(71) Applicant: SAMSUNG ELECTRONICS CO., LTD., Suwon-si (KR)

(72) Inventors: Sunil Kim, Osan-si (KR); Junghyun Park, Seoul (KR); Minkyung Lee, Suwon-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 928 days.

(21) Appl. No.: 17/747,441

(22) Filed: May 18, 2022

(65) Prior Publication Data

US 2023/0117032 A1   Apr. 20, 2023

(30) Foreign Application Priority Data

Oct. 19, 2021   (KR) .................. 10-2021-0138989

(51) Int. Cl.
  *G01S 7/481*   (2006.01)
  *G02B 5/18*   (2006.01)
  *G02B 5/28*   (2006.01)

(52) U.S. Cl.
  CPC .......... *G01S 7/4811* (2013.01); *G02B 5/1814* (2013.01); *G02B 5/28* (2013.01)

(58) Field of Classification Search
  CPC ..... G01S 7/4811; G02B 5/1814; G02F 1/015; G02F 1/292; G02F 1/035
  See application file for complete search history.

(56) References Cited

U.S. PATENT DOCUMENTS

| | | | | |
|---|---|---|---|---|
| 5,276,702 A | * | 1/1994 | Meliga | H01S 5/1228 |
| | | | | 372/96 |
| 9,188,955 B2 | | 11/2015 | Wey et al. | |
| 9,482,887 B2 | * | 11/2016 | Horie | G02F 1/0107 |

(Continued)

FOREIGN PATENT DOCUMENTS

| | | |
|---|---|---|
| JP | 11237563 A | 8/1999 |
| KR | 1020130046535 A | 5/2013 |

(Continued)

OTHER PUBLICATIONS

Park et al. "Dual-guiding-layer resonance structure with an embedded metasurface for quasi-critical coupling without a perfect mirror". (Year: 2020).*

(Continued)

*Primary Examiner* — Yuqing Xiao
*Assistant Examiner* — Jempson Noel
(74) *Attorney, Agent, or Firm* — Sughrue Mion, PLLC

(57) ABSTRACT

A spatial light modulator and a light detection and ranging (LiDAR) apparatus including the spatial light modulator are provided. The spatial light modulator includes: a first reflective layer; a second reflective layer comprising a plurality of grating structures spaced apart from each other; a resonance layer provided between the first reflective layer and the second reflective layer; and a filling layer having a heat transfer coefficient of about 100 mW/mK or less and being in contact with an upper surface of the resonance layer while surrounding at least one grating structure of the plurality of grating structures.

18 Claims, 21 Drawing Sheets

(56) References Cited

U.S. PATENT DOCUMENTS

| | | | |
|---|---|---|---|
| 10,578,721 B2* | 3/2020 | Jang | H01S 5/18344 |
| 2003/0161029 A1* | 8/2003 | Kurtz | G02B 5/3058 |
| | | | 359/290 |
| 2007/0064759 A1* | 3/2007 | Kobayashi | B82Y 20/00 |
| | | | 372/43.01 |
| 2017/0023803 A1 | 1/2017 | Han et al. | |
| 2018/0196137 A1* | 7/2018 | Lee | G01S 7/481 |
| 2018/0196138 A1 | 7/2018 | Lee et al. | |
| 2018/0224709 A1* | 8/2018 | Inada | G02F 1/295 |
| 2020/0183148 A1 | 6/2020 | Park et al. | |
| 2021/0173239 A1 | 6/2021 | Park et al. | |
| 2021/0208256 A1 | 7/2021 | Kim et al. | |
| 2022/0057642 A1 | 2/2022 | Kim et al. | |
| 2022/0171027 A1 | 6/2022 | Kim et al. | |
| 2022/0404547 A1* | 12/2022 | Bian | G02B 6/12004 |

FOREIGN PATENT DOCUMENTS

| | | |
|---|---|---|
| KR | 10-2017-0011945 A | 2/2017 |
| KR | 10-2018-0082308 A | 7/2018 |
| KR | 10-2020-0071909 A | 6/2020 |
| KR | 1020210073703 A | 6/2021 |
| KR | 10-2021-0088047 A | 7/2021 |
| KR | 10-2022-0075180 A | 6/2022 |

OTHER PUBLICATIONS

Side mode suppression using a doped fiber in a long external-cavity semiconductor laser operating at 1490 nm (Year: 2006).*
Communication issued Feb. 24, 2023 by the European Patent Office in counterpart European Patent Application No. 22199390.0.
Communication dated Jun. 26, 2025, issued by the Korean Patent Office in Korean Application No. 10-2021-0138989.

* cited by examiner

SPATIAL LIGHT MODULATOR AND LiDAR APPARATUS INCLUDING THE SAME

CROSS-REFERENCE TO RELATED APPLICATION

This application is based on and claims priority under 35 U.S.C. § 119 to Korean Patent Application No. 10-2021-0138989, filed on Oct. 19, 2021, in the Korean Intellectual Property Office, the disclosure of which is incorporated by reference herein in its entirety.

BACKGROUND

1. Field

The disclosure relates to a spatial light modulator capable of controlling the output phase of light, a light detection and ranging (LiDAR) apparatus including the same, and a method of manufacturing the spatial light modulator.

2. Description of the Related Art

An advanced driving assistance system (ADAS) having various functions has been commercialized. For example, there are an increasing number of vehicles equipped with various functions such as adaptive cruise control (ACC), an autonomous emergency braking (AEB) system, and the like. The ACC may enable the vehicle to reduce the speed when there is a risk of collision and to drive the vehicle within a set speed range when there is no risk of collision, by recognizing the position and speed of other vehicles. The AEB system may recognize another vehicle ahead of a host vehicle, and may prevent a collision by automatically applying braking when there is a risk of collision but the driver does not respond or a response method is inappropriate, and the like. Furthermore, it is expected that vehicles capable of autonomous driving will be commercialized in the near future.

Accordingly, interest in optical measurement devices capable of providing information about the vehicle's surroundings is growing. For example, a light detection and ranging (LiDAR) apparatus for vehicles may provide information on a distance, a relative speed, an azimuth angle, and the like with respect to an object in the vicinity of the vehicle by radiating a laser to a selected region in the vicinity of the vehicle and detecting the reflected laser. To this end, the LiDAR apparatus for vehicles needs a beam steering technology to steer light to a desired region.

A beam steering method may largely include a mechanical method and a non-mechanical method. For example, a mechanical beam steering method may include a method of rotating a light source itself, a method of rotating a mirror that reflects light, a method of moving a spherical lens in a direction perpendicular to the optical axis, etc. Furthermore, a non-mechanical beam steering method may include a method using a semiconductor device and a method of electrically controlling the angle of reflected light by using a reflective phase array.

SUMMARY

One or more example embodiments provide a spatial light modulator with high reliability, a structure of a light detection and ranging (LiDAR) apparatus including the spatial light modulator, a method of manufacturing the spatial light modulator, and a LiDAR apparatus including the spatial light modulator.

According to an aspect of the disclosure, a spatial light modulator includes a first reflective layer; a second reflective layer comprising a plurality of grating structures spaced apart from each other; a resonance layer provided between the first reflective layer and the second reflective layer; and a filling layer having a heat transfer coefficient of about 100 mW/m K or less, and being in contact with an upper surface of the resonance layer and surrounding at least one grating structure of the plurality of grating structures.

The filling layer may include a vacuum layer.

Furthermore, the filling layer may include a layer filled with a fluid.

The fluid may include air.

Furthermore, the filling layer may be in contact with both of an upper surface and a side surface of at least one grating structure of the plurality of grating structures.

The plurality of grating structures may include grating structures of a first group to which a first electrical signal is applied, and grating structures of a second group to which a second electrical signal is applied, and the filling layer may surround the at least one of the grating structures of the first group or the grating structures of the second group.

Furthermore, the filling layer may is be in contact with a portion of the upper surface of the resonance layer located between the grating structures of the first group and the grating structures of the second group.

The spatial light modulator may further include a dielectric layer provided between neighboring grating structures of the grating structures of the first group and having a heat transfer coefficient exceeding about 1000 mW/mK.

Furthermore, the dielectric layer may include at least one of a silicon oxide or a silicon nitride.

The spatial light modulator may further include a cover layer provided on the filling layer and spaced apart from the second reflective layer in a direction in which the first reflective layer, the resonance layer, and the second reflective layer are stacked.

Furthermore, the spatial light modulator may further include a spacer layer including two opposing ends, wherein the two opposing ends include a first end having one end in contact with the resonance layer and a second end in contact with the cover layer.

At least one of the plurality of grating structures may be any one of a PIN structure in which an intrinsic semiconductor layer is provided between a p-type semiconductor layer and an N-type semiconductor layer, a NIN structure in which an intrinsic semiconductor layer is provided two n-type semiconductor layers, and a PIP structure in which an intrinsic semiconductor layer is provided two p-type semiconductor layers.

Furthermore, the pitch of the grating structure may be less than the wavelength of light modulated by the spatial light modulator.

The reflectivity of the second reflective layer may be less than that of the first reflective layer.

Furthermore, the first reflective layer may include a distributed Bragg reflective layer.

The spatial light modulator may further include an etching stop layer provided between the resonance layer and the filling layer.

Furthermore, the side mode suppression ratio (SMSR) of the spatial light modulator may be about 5 dB or more.

According to another aspect of the disclosure, a light detection and ranging (LiDAR) apparatus includes a light source configured to emit light, a spatial light modulator configured to control a traveling direction of the light emitted from the light source to cause the light to travel to an object, and a photodetector configured to detect the light reflected from the object, wherein the spatial light modulator includes a first reflective layer, a second reflective layer including a plurality of grating structures spaced apart from each other; a resonance layer provided between the first reflective layer and the second reflective layer; and a filling layer having a heat transfer coefficient of about 100 mW/mK or less, and being in contact with an upper surface of the resonance layer and covering at least one grating structure of the plurality of grating structures.

Furthermore, the filling layer may be a vacuum layer having no fluid, or a fluid layer filled with a fluid.

The fluid may include air.

Furthermore, the LiDAR apparatus may further include a cover layer provided on the filling layer and spaced apart from the second reflective layer in a direction in which the first reflective layer, the resonance layer, and the second reflective layer are stacked; and a spacer layer including two opposing ends, wherein the two opposing ends include a first end in contact with the cover layer and a second end in contact with the resonance layer.

The LiDAR apparatus may further include an etching stop layer provided between the resonance layer and the filling layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
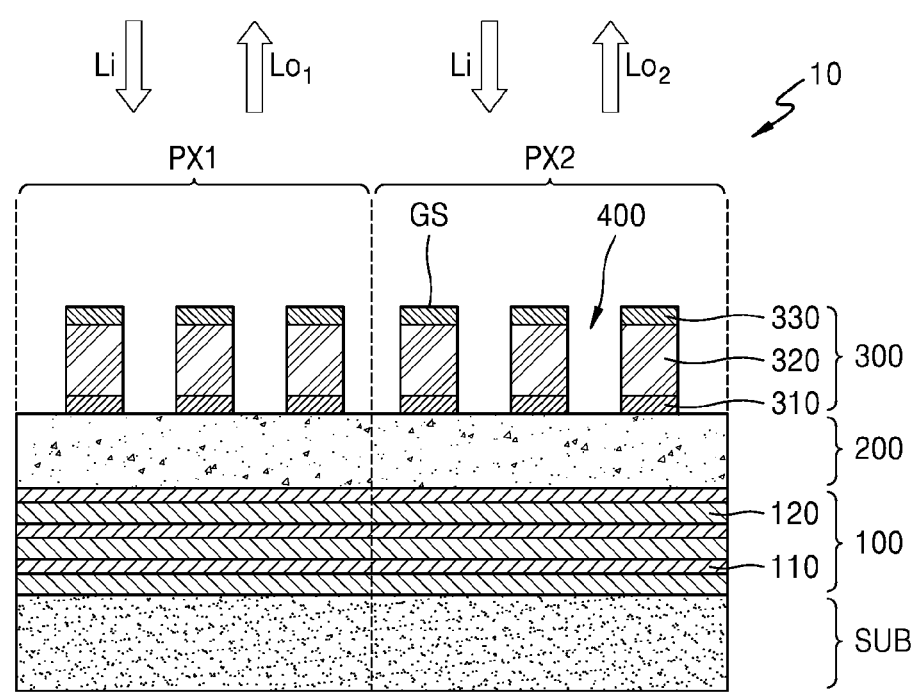
FIG. 1 is a conceptual cross-sectional view of a spatial light modulator according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, spatial light modulators and LiDAR apparatuses including the same according to various embodiments are described in detail with reference to the accompanying drawings. In the accompanying drawings, like reference numerals refer to like elements throughout. The thickness or size of each layer illustrated in the drawings may be exaggerated for convenience of explanation and clarity. Terms such as "first" and "second" are used herein merely to describe a variety of constituent elements, but the constituent elements are not limited by the terms. Such terms are used only for the purpose of distinguishing one constituent element from another constituent element.

An expression used in the singular encompasses the expression of the plural, unless it has a clearly different meaning in the context. It will be further understood that the terms "comprises" and/or "comprising" used herein specify the presence of stated features or components, but do not preclude the presence or addition of one or more other features or components.

Furthermore, the size or thickness of each layer illustrated in the drawings may be exaggerated for convenience of explanation and clarity. Furthermore, when a certain material layer is referred to as being on a substrate or another layer, the material layer may be in direct contact with the substrate or another layer, or a third layer may be therebetween. A material forming each layer in embodiments below is exemplary, and thus other materials may be used therefor.

Furthermore, terms such as "portion," "module," and the like stated in the specification may signify a unit to process at least one function or operation and the unit may be embodied by hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of the term "the" and similar referents in the context of describing the disclosure are to be construed to cover both the singular and the plural.

Also, the steps of all methods described herein can be performed in any suitable order unless otherwise indicated herein or otherwise clearly contradicted by context. Furthermore, the use of any and all examples, or language (e.g., "such as") provided herein, is intended merely to better illuminate the disclosure and does not pose a limitation on the scope of the disclosure unless otherwise claimed.

FIG. 1 is a conceptual cross-sectional view of a spatial light modulator 10 according to an example embodiment.

Referring to FIG. 1, the spatial light modulator 10 may include a first reflective layer 100, a resonance layer 200 arranged on the first reflective layer 100, and a second reflective layer 300 arranged on the resonance layer 200. The resonance layer 200 may be provided between the first reflective layer 100 and the second reflective layer 300. A side mode suppression ratio (SMSR) of the spatial light modulator 10 according to an example embodiment is about 5 dB or more, and thus the directivity of light may be high. The term "SMSR" may refer to an amplitude difference between a main mode (e.g., a main spectral peak, or a center peak longitudinal mode) and a largest side mode (e.g., side peaks, or a nearest higher order mode) in decibels.

The spatial light modulator 10 may output light by modulating the phase of incident light Li. The spatial light modulator 10 may include a plurality of pixels. The pixels may include, for example, a first pixel PX1 and a second pixel PX2. A pixel may refer to the smallest unit that is independently driven in the spatial light modulator 10 or a basic unit that independently modulates the phase of light. A pixel may include one or a plurality of grating structures GS that constitute the second reflective layer 300. FIG. 1 illustrates an example of a structure including two pixels. The length of one side of each of the first and second pixels PX1 and PX2 may be, for example, about 3 μm to about 300 μm.

The spatial light modulator 10 may further include a substrate SUB that supports the first reflective layer 100. The substrate SUB may be a transparent substrate, for example, a silicon substrate or a glass substrate, that transmit light. The substrate SUB is an optional element and may be removed as necessary.

The first reflective layer 100 may be a distributed Bragg reflector. For example, the first reflective layer 100 may include a first layer 110 and a second layer 120 having different refractive indexes. The first layer 110 and the second layer 120 may be alternately and repeatedly stacked. Due to a difference in the refractive index between the first layer 110 and the second layer 120, light may be reflected at an interface of each layer and the reflected light may cause interference. The first layer 110 or the second layer 120 may include silicon (Si), silicon nitride ($Si_3N_4$), silicon oxide ($SiO_2$), titanium oxide ($TiO_2$), and the like. For example, while the first layer 110 may include Si, the second layer 120 may include $SiO_2$. The light reflectivity of the first reflective layer 100 may be set by adjusting the thickness and/or stack number of the first layer 110 and the second layer 120. The light reflectivity of the first reflective layer 100 may vary depending on the thickness and/or the number of the first layer 110 and the second layer 120.

The first reflective layer 100 may include a structure (e.g., a metal reflective layer) other than the distributed Bragg reflector.

Figure 2:
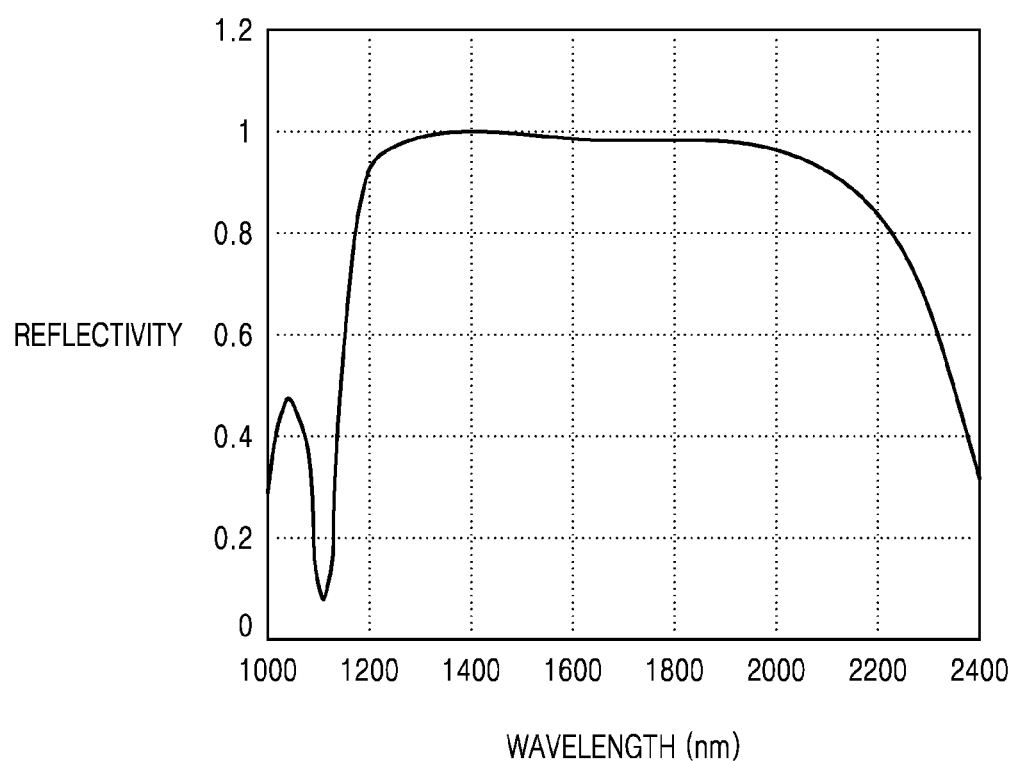
FIG. 2 is a reflection spectrum showing reflectivity when a first reflective layer of FIG. 1 is a distributed Bragg reflector.

FIG. 2 is a reflection spectrum showing reflectivity when the first reflective layer 100 of FIG. 1 is a distributed Bragg reflector. The reflection spectrum shows reflectivity (in the vertical axis) of the first reflective layer according to wavelength of light (in the horizontal axis).

The spectrum of FIG. 2 was measured from a distributed Bragg reflector in which the first layer 110 has a 110 nm thickness and includes Si, the second layer 120 has a 265 nm thickness and includes $SiO_2$, and the first and second layers 110 and 120 are alternately stacked three times. Referring to FIG. 2, the first reflective layer 100 shows a high reflectivity close to 1 in a range of about 1400 nm-about 1800 nm.

Referring back to FIG. 1, the resonance layer 200 is an area where incident light is resonated, and may be arranged between the first reflective layer 100 and the second reflective layer 300.

The resonance layer 200 may include, for example, $SiO_2$. A resonance wavelength may be determined according to the thickness of the resonance layer 200. As the thickness of the resonance layer 200 increases, the resonance wavelength of light may increase, whereas as the thickness of the resonance layer 200 decreases, the resonance wavelength of light may decrease.

The second reflective layer 300 may has a structure that enables a reflection function of reflecting light of a specific wavelength and a phase modulation function of modulating the phase of output light.

The second reflective layer 300 may include the grating structures GS that are arranged apart from each other at certain intervals. The thickness, width, and pitch of the grating structures GS may be less than the wavelength of light that is modulated by the spatial light modulator 10. The reflectivity of light that is modulated may be increased by adjusting the thickness, width, pitch, and the like of the grating structures GS. The reflectively of the second reflective layer 300 may be different from that of the first reflective layer 100, and the reflectivity of the second reflective layer 300 may be less than that of the first reflective layer 100.

The incident light Li on the spatial light modulator 10 may transmit through the second reflective layer 300, and then may propagate to the resonance layer 200, and may be reflected by the first reflective layer 100. Then, the light is trapped and resonated in the resonance layer 200 by the first reflective layer 100 and the second reflective layer 300 and then output through the second reflective layer 300. Output light $Lo_1$ and $Lo_2$ may have a specific phase, and the phase of the output light $Lo_1$ and $Lo_2$ may be controlled by the refractive index of the second reflective layer 300. The traveling direction light may be determined by a relationship of the phase of light output from adjacent pixels. For example, when the phase of the output light $Lo_1$ of the first pixel PX1 and the phase of the output light $Lo_2$ of the second pixel PX2 are different from each other, the traveling direction of light may be determined by the interaction of the output light $Lo_1$ and $Lo_2$.

Figure 3A:
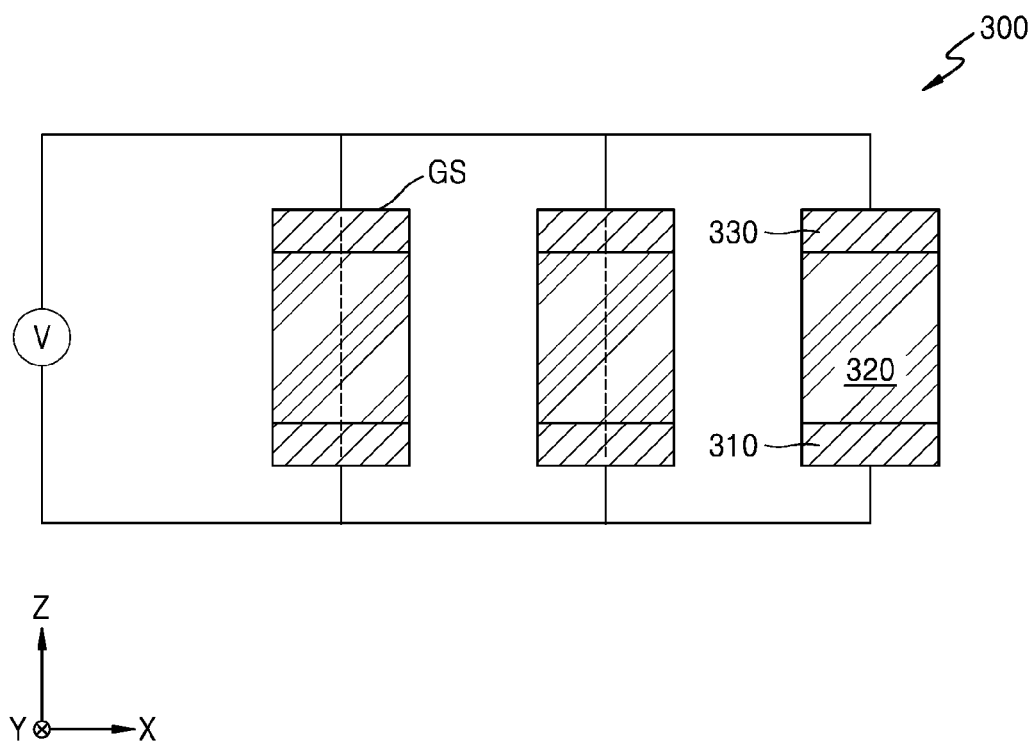
FIG. 3A is a cross-sectional view showing grating structures of a first pixel of FIG. 1.
Figure 3B:
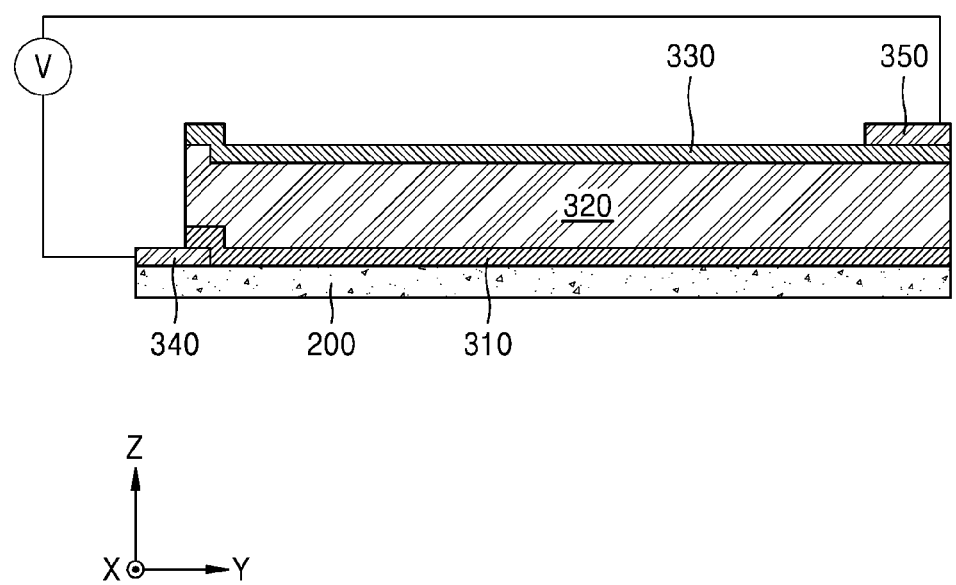
FIG. 3B is a cross-sectional view of grating structures that are cut in another direction.

FIG. 3A is a cross-sectional view showing the grating structures GS of the first pixel PX1 of FIG. 1. FIG. 3B is a cross-sectional view of the grating structures GS that are cut in another direction. Referring to FIG. 3A, the grating structures GS may include a first doped semiconductor layer 310, an intrinsic semiconductor layer 320, and a second doped semiconductor layer 330. For example, the first doped semiconductor layer 310 may be an n-type semiconductor layer, the second doped semiconductor layer 330 may be a p-type semiconductor layer, and the grating structures GS may be a PIN diode.

The first doped semiconductor layer 310 may be a Si layer containing a group 5 element, for example, phosphorus (P) or arsenic (As), as impurities. The concentration of impurities included in the first doped semiconductor layer 310 may be about $10^{15}$ to $10^{21}$ $cm^{-3}$. The intrinsic semiconductor layer 320 may be a Si layer that does not include impurities. The second doped semiconductor layer 330 may be a Si layer containing a group 3 element, for example, boron (B), as impurities. The concentration of impurities included in the second doped semiconductor layer 330 may be about $10^{15}$ to $10^{21}$ $cm^{-3}$.

When a voltage is applied between the first doped semiconductor layer 310 and the second doped semiconductor layer 330, a current flows in a direction from the first doped semiconductor layer 310 to the second doped semiconductor layer 330. Heat is generated in the grating structures GS due to the current, and thus the refractive indexes of the grating structures GS may be changed by the heat. When the refractive indexes of the grating structures GS are changed, the phase of light output from the first and second pixels PX1 and PX2 may be changed. Accordingly, the traveling direction of the light output from the spatial light modulator 10 may be controlled by adjusting the amount of a voltage V applied to each of the first and second pixels PX1 and PX2.

FIG. 3B is a cross-sectional view of the grating structures GS in another direction (Y direction). Referring to FIG. 3B, the spatial light modulator 10 may include first and second electrodes 340 and 350 to apply a voltage to the grating structures GS. The first electrode 340 may be in contact with one end of the first doped semiconductor layer 310, and the second electrode 350 may be in contact with one end of the second doped semiconductor layer 330. The second electrode 350 may be in contact with an end portion arranged in the Y direction opposite to the end portion that is in contact with the first electrode 340. The first electrode 340 may be arranged above the resonance layer 200, and may be a common electrode that applies a common voltage to all pixels included in the spatial light modulator 10. The second electrode 350 may be a pixel electrode that is configured to apply a different voltage to each pixel.

Although FIGS. 3A and 3B illustrate the grating structures GS in a PIN structure, the disclosure is not limited thereto. The grating structures GS may have an NIN structure in which an intrinsic semiconductor layer is provided two n-type semiconductor layers or a PIP structure in which an intrinsic semiconductor layer is provided two p-type semiconductor layers. For example, the first and second doped semiconductor layer 310 and 330 may be n-type semiconductor layers or p-type semiconductor layers.

Figure 4:
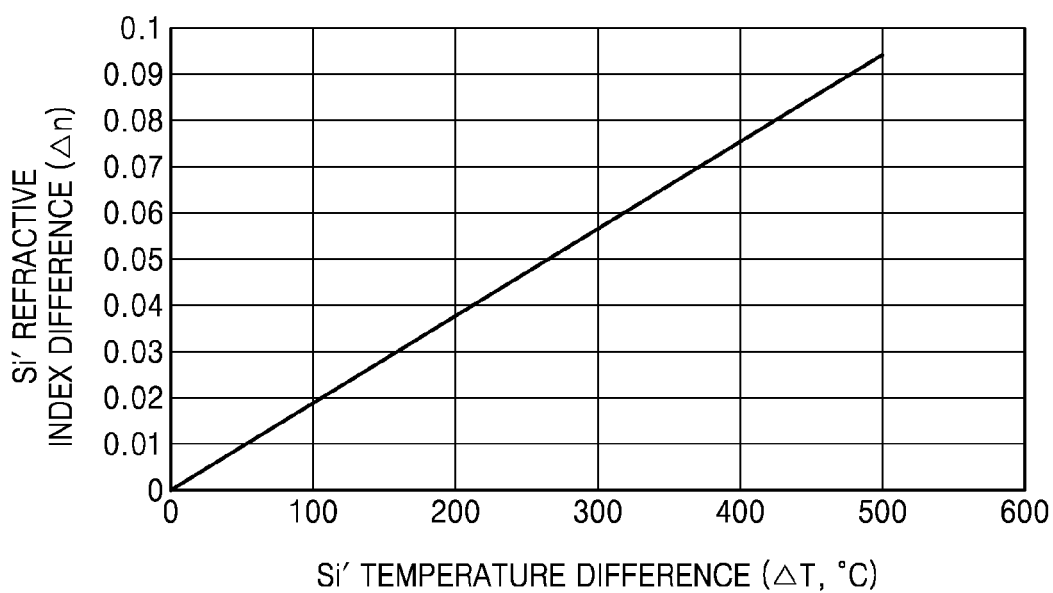
FIG. 4 is a graph showing a relationship between a refractive index and temperature of silicon, according to an example embodiment.

The grating structures GS of the spatial light modulator 10 according to an example embodiment is based on Si. The refractive index of Si is proportional to a temperature. FIG. 4 is a graph showing a relationship between a refractive index and temperature of silicon, according to an example embodiment. As illustrated in FIG. 4, as a Si's temperature change increases, a Si's refractive index change increases. The Si's refractive index change is in direct proportion to the Si's temperature change, and thus, the refractive index change may be easily controlled by controlling the temperature change. Thus, by controlling an electrical signal applied to Si, the refractive indexes of the grating structures GS may be easily controlled.

As the heat generated in one grating structures GS may be transferred to another grating structures GS adjacent thereto, crosstalk may be increased and also the pixel driving of the spatial light modulator 10 may be difficult.

The spatial light modulator 10 according to an example embodiment may further include a filling layer 400 that surrounds at least one of the grating structures GS and is in contact with an upper surface of the resonance layer 200. The filling layer 400 may have a heat transfer coefficient of about 100 mW/mK or less. As the heat transfer coefficient of the filling layer 400 is about 100 mW/mK or less, heat transfer between the grating structures GS may be reduced.

The filling layer 400 may be a vacuum layer. The heat transfer coefficient of the vacuum layer may be about 0 mW/mK.

Alternatively, the filling layer 400 may be a layer filled with a fluid. For example, the filling layer 400 may be a layer filled with air. The heat transfer coefficient of air is about 25 mW/mK.

According to an example embodiment, as the grating structures GS are divided by the filling layer 400 having a low heat transfer coefficient, the heat generated from one of the grating structures GS may be prevented from being transferred to the other of the grating structures GS, thereby reducing crosstalk between the grating structures GS.

Figure 5:
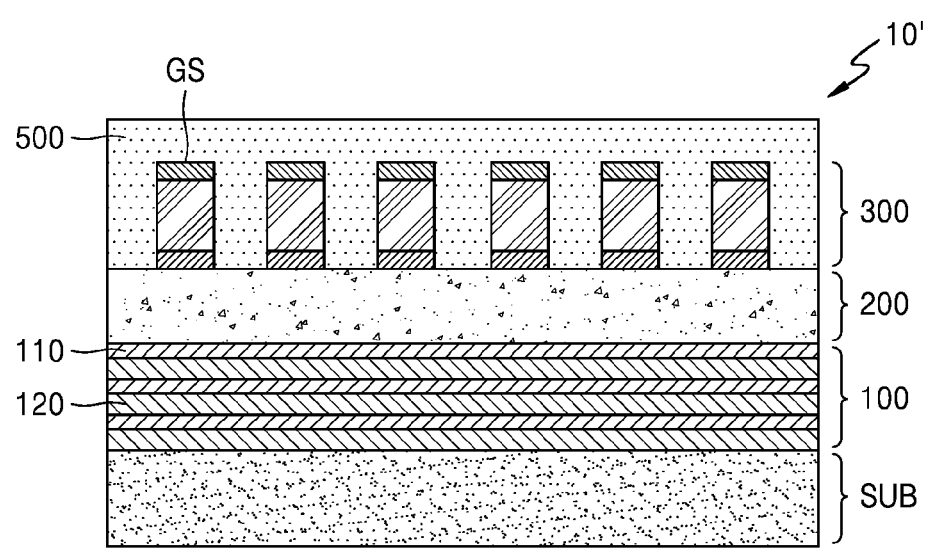
FIG. 5 illustrates a spatial light modulator in which grating structures are divided by a silicon oxide layer, as a comparative example.

FIG. 5 illustrates a spatial light modulator 10' in which the grating structures GS are divided by a Si oxide layer 500, as a comparative example. The heat transfer coefficient of a Si oxide is about 1300 mW/mK, which is about 13 times or more greater than the heat transfer coefficient of the filling layer 400 according to an example embodiment.

In the spatial light modulator 10 of an example embodiment and the spatial light modulator 10' of the comparative example, the first reflective layer 100 is formed by stacking three pairs of layers of Si and $SiO_2$ materials in the thicknesses of about 110 nm and about 265 nm, respectively. The resonance layer 200 is formed of $SiO_2$ on the first reflective layer 100, and as a PIN structure of the grating structures GS, an n-type semiconductor layer having a thickness of about 100 nm, the intrinsic semiconductor layer 320 having a thickness of about 300 nm, and a p-type semiconductor layer having a thickness of about 100 nm are stacked.

Figure 6A:
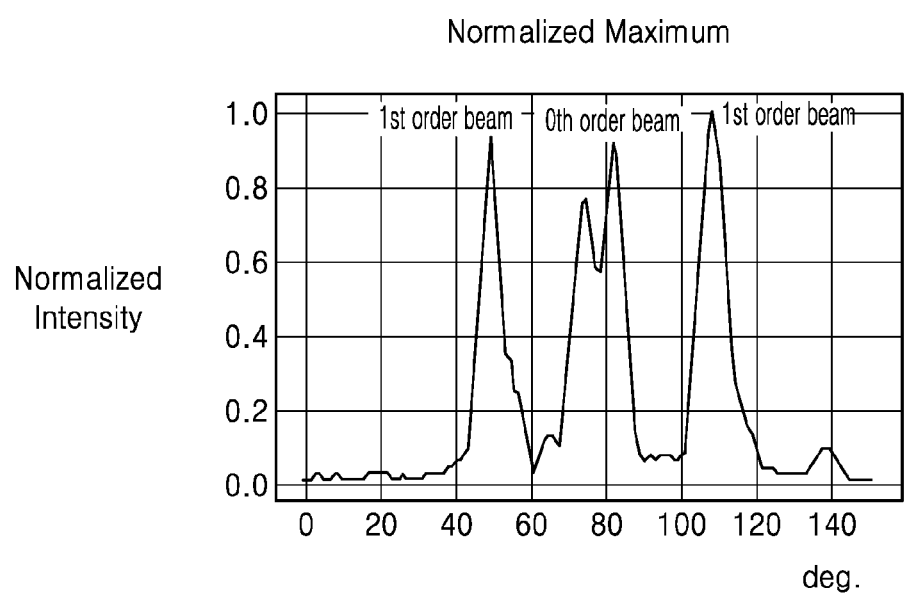
FIG. 6A is a graph showing a result of evaluating the directivity of a spatial light modulator of a comparative example.
Figure 6B:
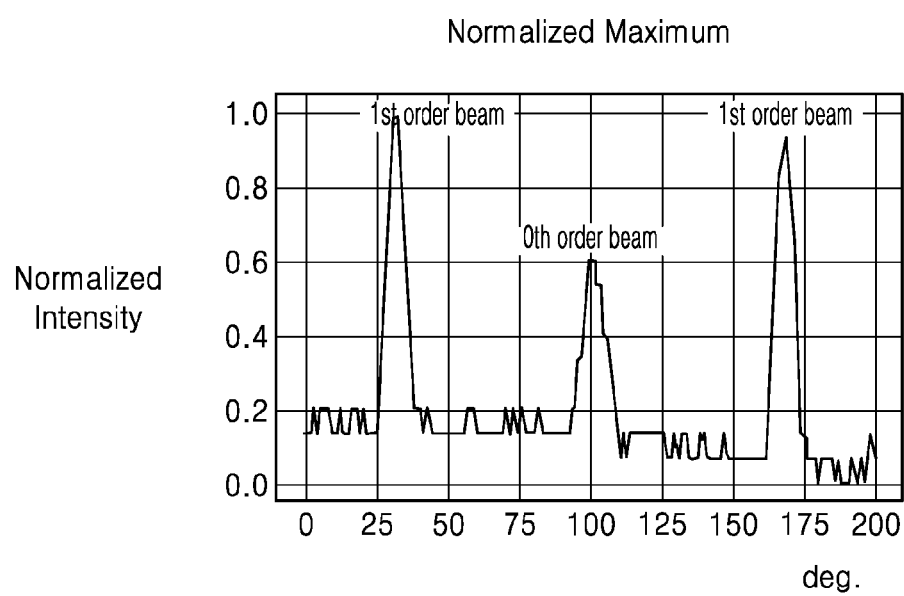
FIG. 6B is a graph showing a result of evaluating the directivity of a spatial light modulator according to an example embodiment.

The grating structures GS of the spatial light modulator 10 according to an example embodiment are divided by air, and the grating structures GS of the comparative example are divided by $SiO_2$. FIG. 6A is a graph showing a result of evaluating the directivity of the spatial light modulator 10' of the comparative example. FIG. 6B is a graph showing a result of evaluating the directivity of the spatial light modulator 10 according to an example embodiment.

A side mode suppression ratio (SMSR) refers to the intensity of the 1st order beam with respect to the intensity of the 0th order beam, and as the SMSR increases, the directivity of light increases. It may be checked that, while the SMSR of the spatial light modulator 10 of an example embodiment is about 6.92 dB, the SMSR of the spatial light modulator 10 of the comparative example is almost about 0 dB. Accordingly, it may be seen that the spatial light modulator 10 according to an example embodiment in which the grating structures GS are divided by air has an improved SMSR compared with the spatial light modulator 10' of the comparative example in which the grating structures GS are divided by an Si oxide.

FIGS. 7A to 7F are cross-sectional views showing a method of manufacturing the spatial light modulator 10, according to an example embodiment.

Figure 7A:
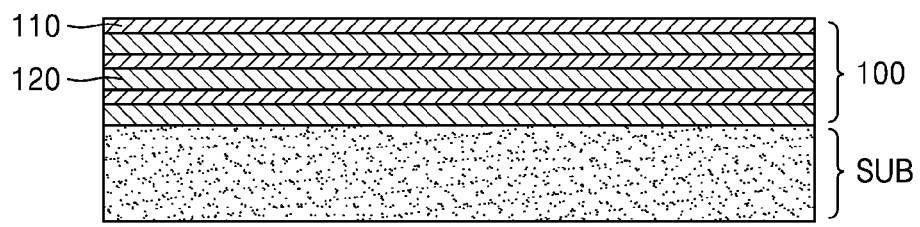
FIGS. 7A to 7F are cross-sectional views showing a method of manufacturing a spatial light modulator, according to an example embodiment.

Referring to FIG. 7A, the first reflective layer 100 may be formed on the substrate SUB.

The substrate SUB may be a substrate including a transparent material that transmits light, for example, a Si substrate or a glass substrate.

The first reflective layer 100 may be a distributed Bragg reflective layer in which the first and second layers 110 and 120 having different refractive indexes are stacked, and the first layer 110 may include, for example, Si of a thickness of about 110 nm, and the second layer 120 may include, for example, $SiO_2$ of a thickness of about 265 nm. The first reflective layer 100 may include the first and second layers 110 and 120 that are repeatedly or alternately arranged. The first and second layers 110 and 120 may be placed on top of each other. The first and second layers 110 and 120 may be formed, for example, by a chemical vapor deposition (CVD) method.

Figure 7B:
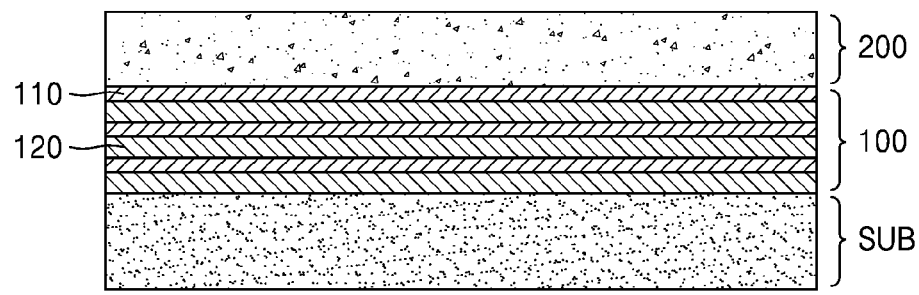

Referring to FIG. 7B, the resonance layer 200 is provided on the first reflective layer 100. The resonance layer 200 may include, for example, $SiO_2$. The thickness of the resonance layer 200 may be about 300 μm to about 1500 μm, and may be formed, for example, by the CVD deposition.

Figure 7C:
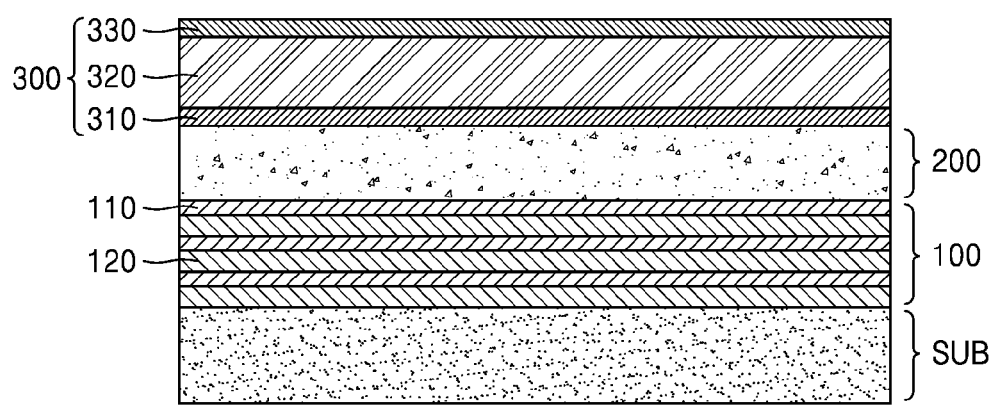
Figure 7D:
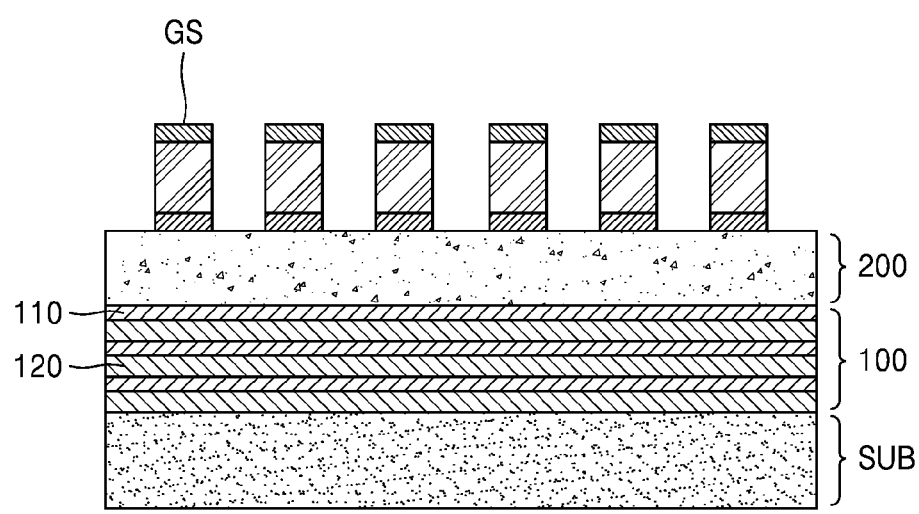
Figure 7E:
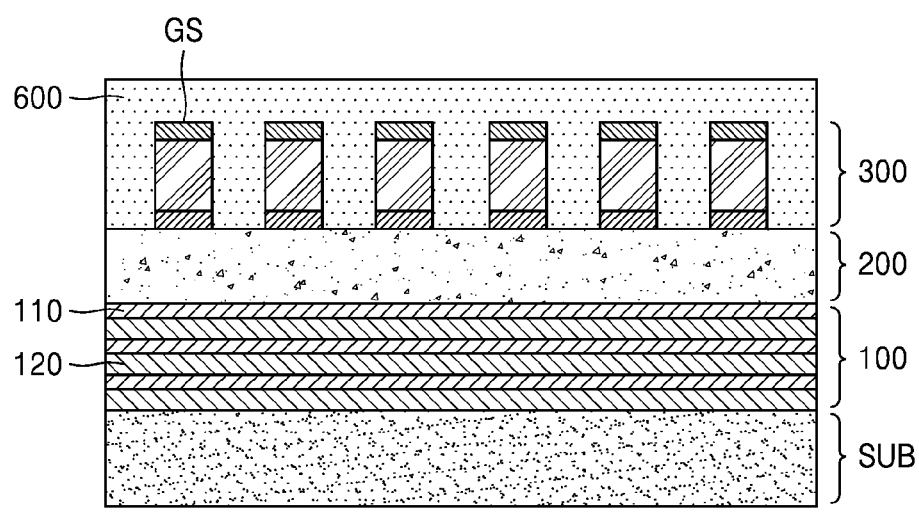

Referring to FIGS. 7C to 7E, the second reflective layer 300 having the grating structures GS may be provided on the resonance layer 200.

Referring to FIG. 7C, the first doped semiconductor layer 310, the intrinsic semiconductor layer 320, and the second doped semiconductor layer 330 are sequentially formed on the resonance layer 200. The first doped semiconductor layer 310, the intrinsic semiconductor layer 320, and the second doped semiconductor layer 330 may be formed by the CVD method.

Referring to FIG. 7D, by patterning the first doped semiconductor layer 310, the intrinsic semiconductor layer 320, and the second doped semiconductor layer 330, the grating structures GS that are arranged apart from each other may be formed. For example, the grating structures GS having a certain width and pitch may be formed through a photolithography process and an etching process.

Referring to FIG. 7E, a sacrificial layer 600 may fill between the grating structures GS. The sacrificial layer 600 may include a Si oxide. However, the disclosure is not limited thereto. The sacrificial layer 600 may be formed of a material that is distinguished from the grating structures GS and is easily etched.

Thereafter, an additional heat treatment process may be performed. While Si included in the grating structures GS has a polycrystalline structure, the grating structures GS may be heat treated such that the height of partial or entire grain of the polycrystalline structure is the same as the thickness of the grating structures GS. In other words, the crystal size of the grating structures GS is increased through the heat treatment, and thus, the grain may have a column shape. The sacrificial layer 600 may prevent the grating structures GS, an electrode, and the like from being oxidized during the heat treatment.

The heat treatment may be a short heat treatment at high temperature, or a long heat treatment at low temperature and then an additional heat treatment at high temperature.

For example, the heat treatment on the grating structures GS may be performed at low temperature for a long time. For example, the grating structures GS may be heated at a temperature of about 500° C.-about 650° C. for about 8 hours-about 12 hours. Accordingly, the grating structures GS may have a polycrystalline structure having a large crystal size.

After the low-temperature heat treatment, a high-temperature heat treatment for heating at high temperature for a short time may be further included. The high-temperature heat treatment may be performed at about 750° C. or more within about 10 minutes. The high-temperature heat treatment may be performed at about 900° C. or less for about 1 minute or more. Through the high-temperature heat treatment, defects remaining in the grating structures GS may be removed, and thus, the crystallinity of the grating structures GS may be further improved.

Figure 7F:
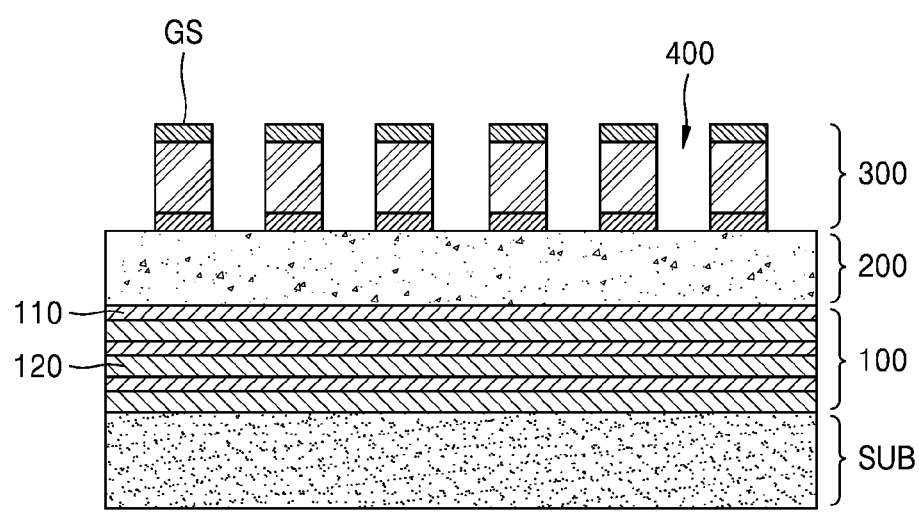

Referring to FIG. 7F, the sacrificial layer 600 may be removed. A space left after the sacrificial layer 600 is removed may be filled with air. The above-described air layer may become the filling layer 400 according to an example embodiment. In the process of removing the sacrificial layer 600, the material of the sacrificial layer 600 may remain above the grating structures GS. In addition to air, the space may be filled with a fluid having a heat transfer coefficient of about 100 mW/mK or less. Alternatively, the air and the like may be then removed such that the space between the grating structures GS may be in a vacuum state.

As the space between the grating structures GS is filled with a fluid having a low thermal conductivity or maintained in a vacuum state, the thermal crosstalk between the grating structures GS may be reduced, thereby improving a light steering efficiency.

Figure 8:
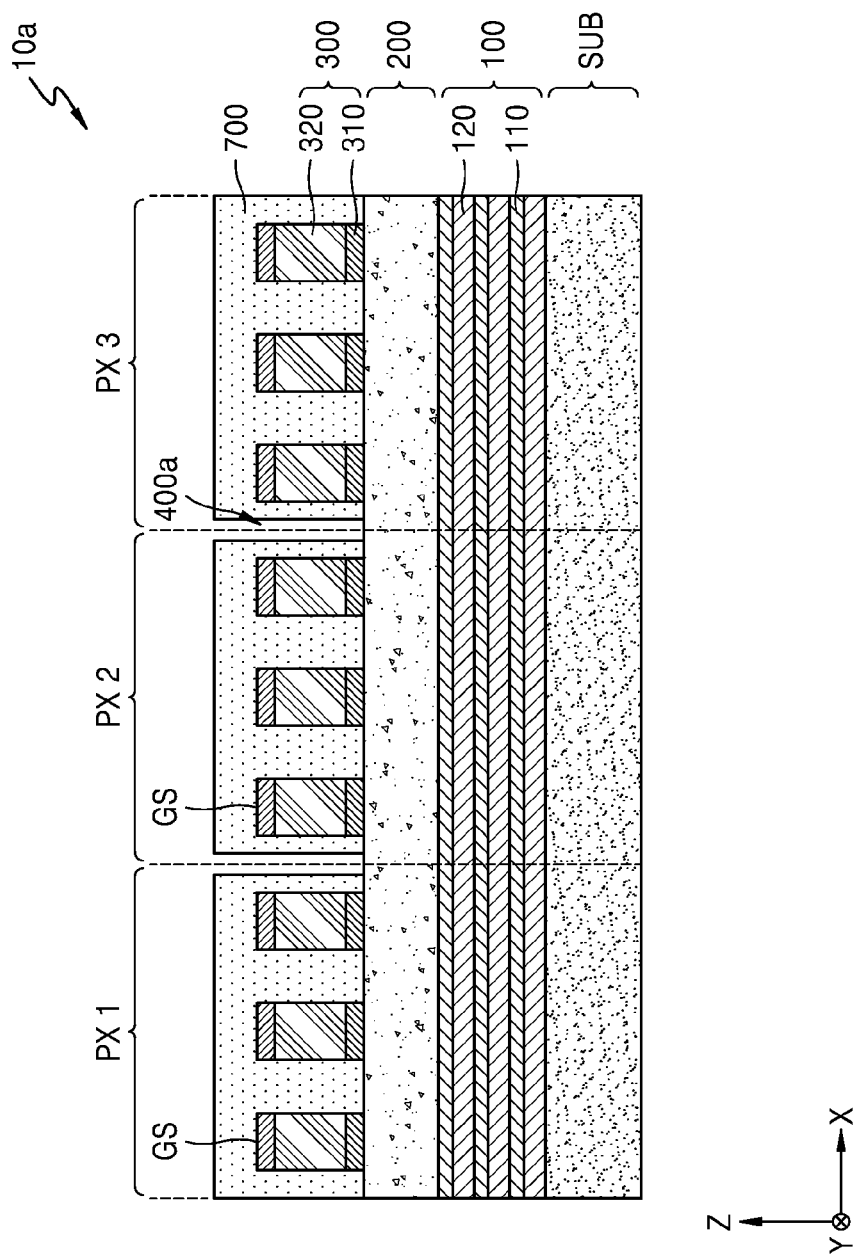
FIG. 8 is a cross-sectional view of a spatial light modulator according to another example embodiment.

FIG. 8 is a cross-sectional view of a spatial light modulator 10a according to another example embodiment. Referring to FIG. 8, the grating structures GS may be grouped by a pixel unit, and the grating structures GS that are grouped may be surrounded by a dielectric layer.

The grating structures GS may include a grating structure PX1 of a first group, a grating structure PX2 of a second group, and a grating structure PX3 of a third group. A first electrical signal, for example, a current, may be applied to the grating structure PX1 of the first group, a second electrical signal may be applied to the grating structure PX2 of the second group, and a third electrical signal may be applied to the grating structure PX3 of the third group. Thus, each of the grating structures PX1, PX2, and PX3 of the first to third groups may form a pixel. As the same electrical signal is applied in units of groups in the grating structures GS, the grating structures in the same group may have the same heat distribution. In the grating structure in a group unit, a dielectric layer 700 having a high heat transfer coefficient may connect the grouped grating structures. The dielectric layer 700 may have a heat transfer coefficient of about 1000 mW/mK or more. For example, the dielectric layer 700 may include at least one of a Si oxide or a Si nitride.

Each of the grating structures PX1, PX2, and PX3 that are grouped may be surrounded by a filling layer 400a having a heat transfer coefficient of 100 mW/mK or less. The filling layer 400a may be in contact with the upper surface of the resonance layer 200 that is exposed between the grouped grating structures PX1, PX2, and PX3.

Figure 9:
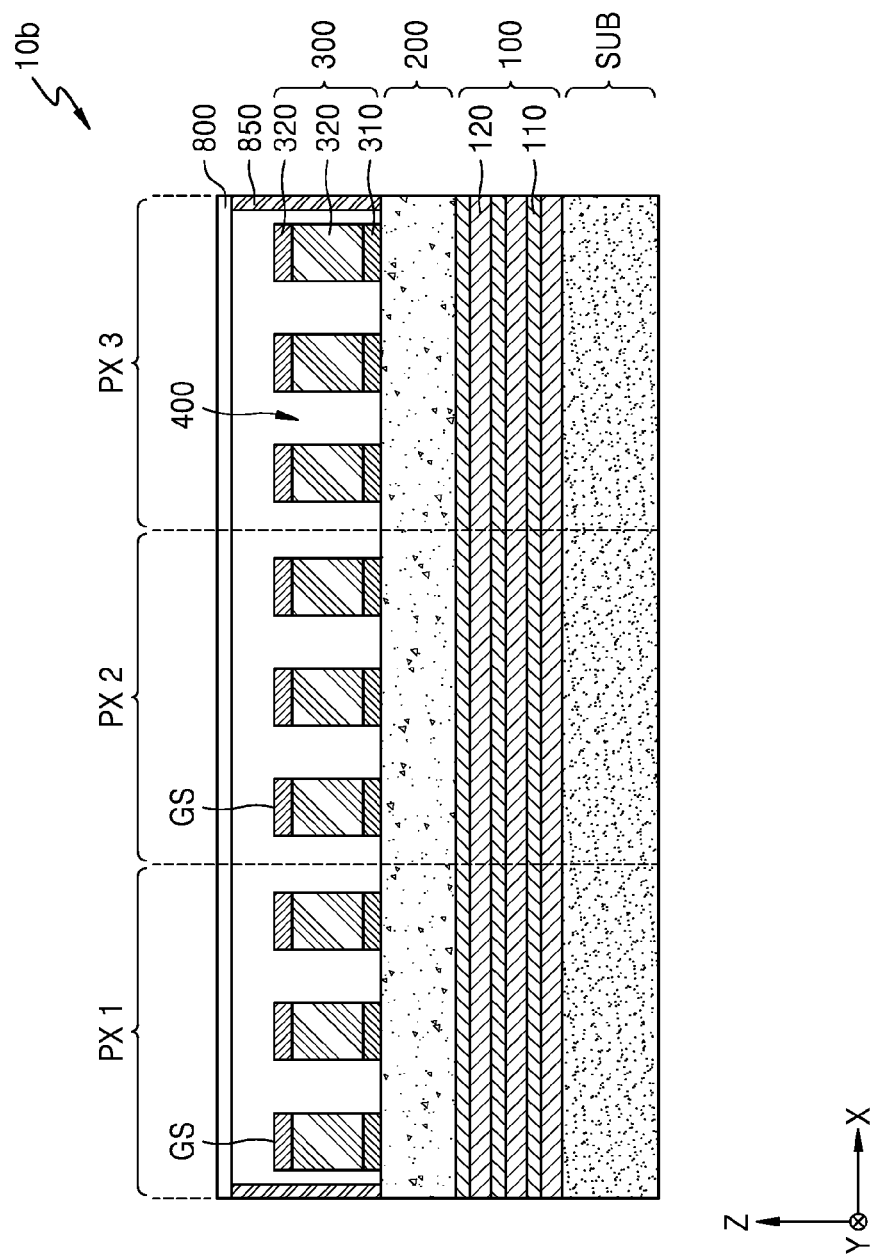
FIG. 9 is a cross-sectional view of a spatial light modulator including a cover layer and a spacer layer, according to an example embodiment.

FIG. 9 is a cross-sectional view of a spatial light modulator 10b including a cover layer 800 and a spacer layer 850, according to an example embodiment. When comparing FIG. 9 with FIG. 1, the spatial light modulator 10b of FIG. 9 may further include the cover layer 800 arranged on the filling layer 400 and spatially apart from the grating structures GS and the spacer layer 850 having one end in contact with the resonance layer 200 and the other end in contact with the cover layer 800. Both of the cover layer 800 and the spacer layer 850 may be formed of a light transmissive material. The cover layer 800 may prevent the grating structures GS from being exposed to the outside and contaminated. The spacer layer 850 may support the cover layer 800 to be spatially apart from the grating structures GS. The spacer layer 850 may prevent the cover layer 800 from being in contact with the grating structures GS, thereby preventing generation of thermal crosstalk between the grating structures GS or pixels. The thickness of the spacer layer 850 may be greater than that of each of the grating structures GS.

Figure 10:
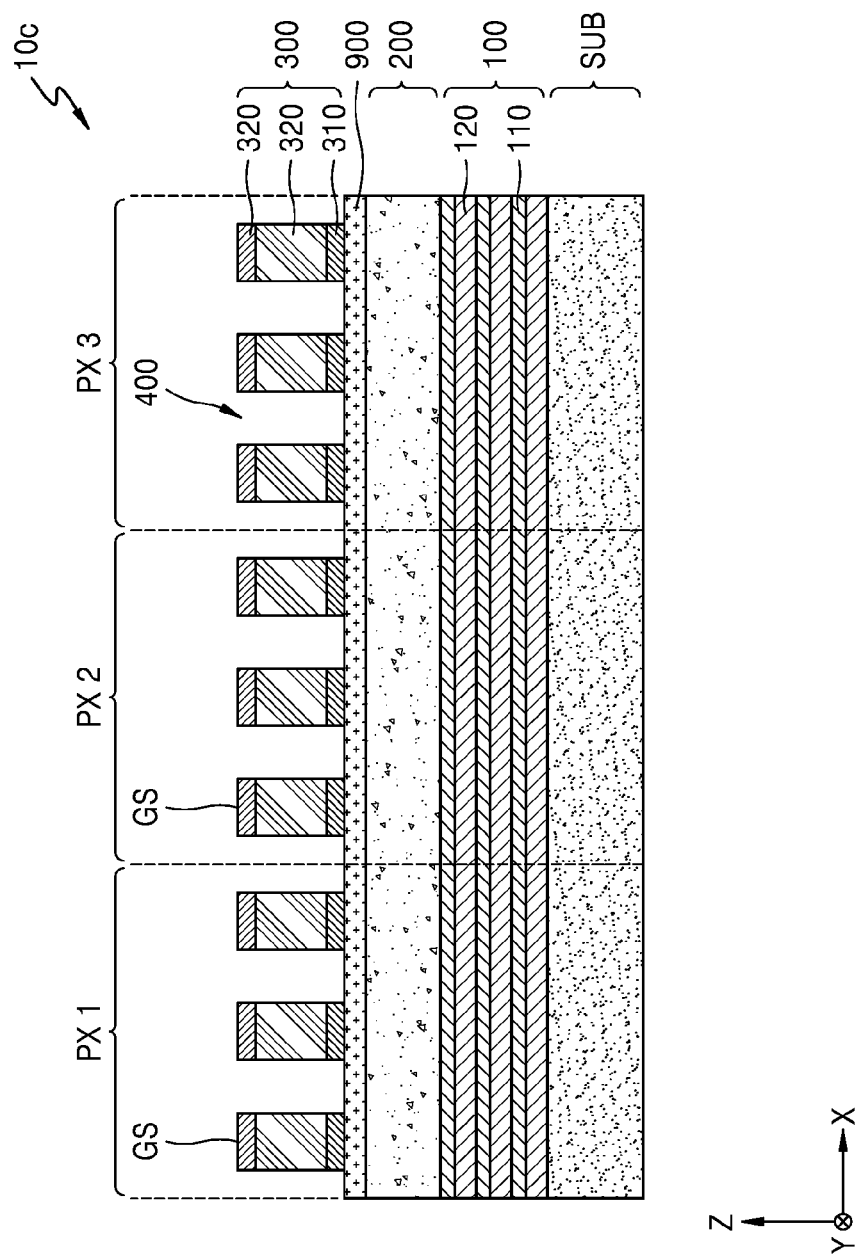
FIG. 10 is a cross-sectional view of a spatial light modulator including an etching stop layer, according to an example embodiment.

FIG. 10 is a cross-sectional view of a spatial light modulator 10c including an etching stop layer 900, according to an example embodiment. When comparing FIG. 10 with FIG. 1, the spatial light modulator 10c of FIG. 10 may further include the etching stop layer 900 on the upper surface of the resonance layer 200. The etching stop layer 900 may prevent the resonance layer 200 from being damaged by an etching process during the processes of forming the grating structures GS and removing the sacrificial layer 600. In FIG. 10, the etching stop layer 900 is illustrated as being arranged on the entire upper surface of the resonance layer 200. However, the disclosure is not limited thereto. The etching stop layer 900 may be arranged in a region of the upper surface of the resonance layer 200 that is not overlapped with the grating structures GS. The etching stop layer 900 may include a material different from the resonance layer 200. For example, the etching stop layer 900 may include a Si nitride.

The spatial light modulators 10, 10a, 10b, and 10c described above may be applied to, for example, beam steering devices such as depth sensors used in three-dimensional cameras or three-dimensional sensors such as LiDAR apparatuses, to increase precision. LiDAR apparatuses may be applied to mobile devices such as autonomous vehicles, drones, and the like, small walking means, for example, bicycles, motorcycles, strollers, boards, etc., robots, auxiliary means for people/animals, for example, sticks, helmets, accessories, clothing, watches, bags, etc., Internet of Things (IoT) devices/systems, security devices/systems, and the like.

Furthermore, the spatial light modulators 10, 10a, 10b, and 10c may be applied to various systems other than LiDAR apparatuses. For example, as three-dimensional information of space and an object may be acquired through scanning by using the spatial light modulators 10, 10a, 10b, and 10c, the spatial light modulators 10, 10a, 10b, and 10c may be applied to a three-dimensional image acquisition device, a three-dimensional camera, and the like. Furthermore, the spatial light modulators 10, 10a, 10b, and 10c may be applied to a holographic display device and a structured light generation device. Furthermore, the spatial light modulators 10, 10a, 10b, and 10c may be applied to various optical devices such as hologram generators, optical coupling devices, variable focus lenses, depth sensors, and the like. Furthermore, the spatial light modulators 10, 10a, 10b, and 10c may be applied to various fields in which a meta surface or a meta structure is used. In addition, the spatial light modulators 10, 10a, 10b, and 10c according to embodiments of the disclosure, and a LiDAR apparatus including the same, may be applied to various fields of optical and electronic devices for various uses.

Figure 11:
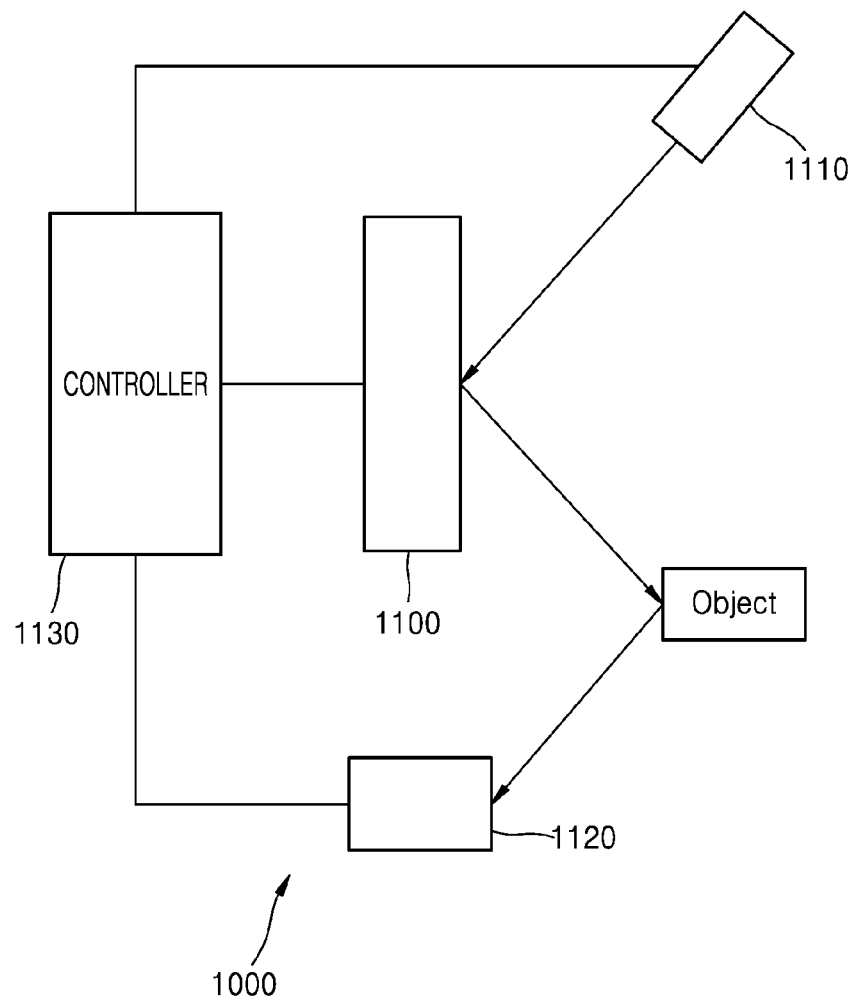
FIG. 11 is a schematic block diagram showing the structure of a LiDAR apparatus according to an example embodiment.

FIG. 11 is a schematic block diagram showing the structure of a LiDAR apparatus 1000 according to an example embodiment.

Referring to FIG. 11, the LiDAR apparatus 1000 according to an example embodiment may include a light source 1110 for radiating light, a spatial light modulator 1100 for controlling a traveling direction of incident light from the light source 1110, a photodetector 1120 for detecting light emitted from the spatial light modulator 1100 and reflected from an object, and a controller (e.g., a processor) 1130 for controlling the spatial light modulator 1100.

The light source 1110 may include, for example, a light source for emitting visible light or a laser diode (LD) or light-emitting diode (LED) for emitting a near infrared ray of about 800 nm to about 1700 nm band.

The spatial light modulator 1100 may include the spatial light modulators 10, 10a, 10b, and 10c of FIGS. 1, 8, 9, and 10. The spatial light modulator 1100 may control the traveling direction of light by modulating the phase of light for each pixel. The spatial light modulator 1100 may scan light with a wide viewing angle.

The controller 1130 may control the operations of the spatial light modulator 1100, the light source 1110, and the photodetector 1120. For example, the controller 1130 may control the on/off operation of the light source 1110 and the photodetector 1120, and the beam scanning operation of the spatial light modulator 1100. Furthermore, the controller 1130 may calculate information about the object on the basis of a measurement result of the photodetector 1120.

The LiDAR apparatus 1000 may periodically radiate light with respect to many regions therearound, by using the spatial light modulator 1100, to acquire information about objects therearound at a plurality of locations.

Figure 12:
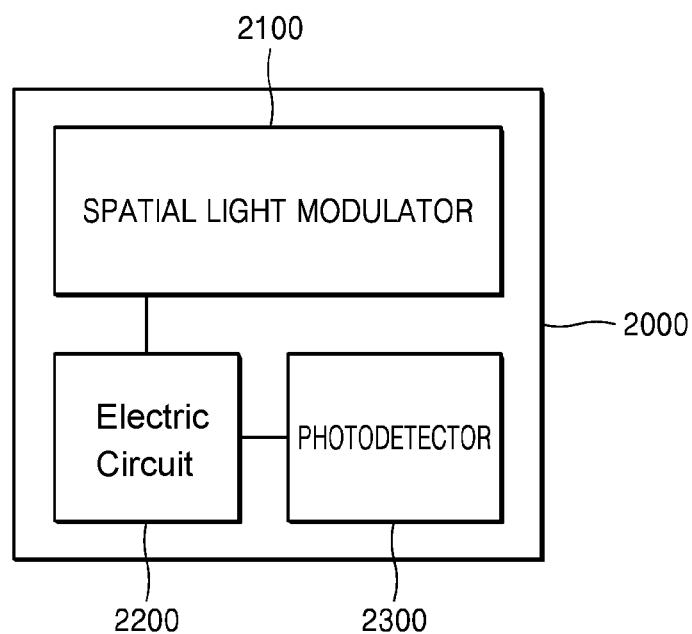
FIG. 12 is a schematic block diagram showing the structure of a LiDAR apparatus according to another example embodiment.

FIG. 12 is a schematic block diagram showing the structure of a LiDAR apparatus 2000 according to another example embodiment.

Referring to FIG. 12, The LiDAR apparatus 2000 may include a spatial light modulator 2100 and a photodetector 2300 for detecting light that has a traveling direction controlled by the spatial light modulator 2100 and is reflected by an object. The LiDAR apparatus 2000 may further include an electric circuit 2200 connected to the spatial light modulator 2100 and/or the photodetector 2300. The electric circuit 2200 may include an operating portion for acquiring and operating data, a driving portion, a controller, and the like. Furthermore, the electric circuit 2200 may further include a power unit, a memory, and the like.

The LiDAR apparatus 2000 of FIG. 12 is illustrated as including the spatial light modulator 2100 and the photodetector 2300 in one device, the spatial light modulator 2100 and the photodetector 2300 may be separately provided in separate devices, not provided in one device. Furthermore, the electric circuit 2200 may be connected to the spatial light modulator 2100 or the photodetector 2300, not in a wired manner, but in a wireless communication manner.

The above-described LiDAR apparatuses may be a phase-shift type apparatus or a time-of-flight (TOF) type apparatus.

Figure 13A:
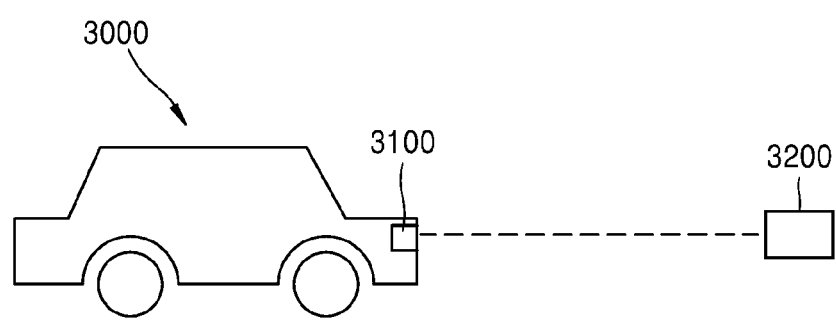
FIG. 13A is a view of a vehicle equipped with a LiDAR apparatus, when viewed from the side of the vehicle.
Figure 13B:
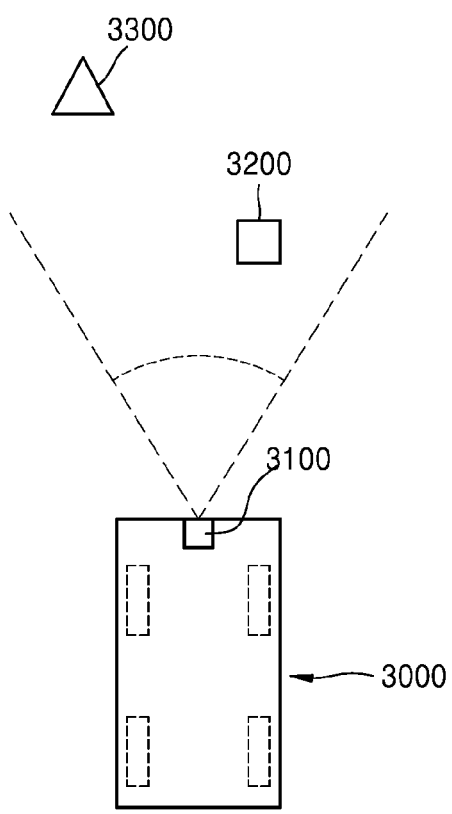
FIG. 13B is a view of a vehicle equipped with a LiDAR apparatus, when viewed from above of the vehicle.

FIGS. 13A and 13B are conceptual views showing a case in which a LiDAR apparatus 3100 is applied to a vehicle 3000. FIG. 13A is a view when viewed from the side of the vehicle, and FIG. 13B is a view when viewed from the above.

Referring to FIG. 13A, the LiDAR apparatus 3100 may be applied to the vehicle 3000, and information about an object 3200 may be acquired by using the LiDAR apparatus 3100. The vehicle 3000 may be a vehicle having an autonomous function. An object or a human, that is, the object 3200, located in a direction in which the vehicle 3000 drives may be detected by suing the LiDAR apparatus 3100. Furthermore, a distance to the object 3200 may be measured by using information such as a time difference between a transmitting signal and a detection signal. Furthermore, as illustrated in FIG. 13B, information about the object 3200 located nearby and an object 3300 located remotely, which are within a scan range, may be acquired.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

As the heat transfer between the grating structures or pixels included in the spatial light modulator and the LiDAR apparatus according to an example embodiment is reduced, a light phase modulation efficiency may be improved.

The foregoing example embodiments and advantages are merely exemplary and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A spatial light modulator comprising:
a first reflective layer;
a second reflective layer comprising a plurality of grating structures spaced apart from each other;
a resonance layer provided between the first reflective layer and the second reflective layer; and
a filling layer having a heat transfer coefficient of about 100 mW/mK or less, and being in contact with an upper surface of the resonance layer and surrounding at least one grating structure of the plurality of grating structures,
wherein the filling layer is in a vacuum state or filled with air, and
wherein each of the plurality of grating structures comprises a first doped semiconductor layer, an intrinsic semiconductor layer, and a second doped semiconductor layer and has a polycrystalline structure.

2. The spatial light modulator of claim 1, wherein the filling layer is in contact with both of an upper surface and a side surface of the at least one grating structure of the plurality of grating structures.

3. The spatial light modulator of claim 1, wherein the plurality of grating structures comprise:
grating structures of a first group to which a first electrical signal is applied; and
grating structures of a second group to which a second electrical signal is applied, and
wherein the filling layer surrounds at least one of the grating structures of the first group or the grating structures of the second group.

4. The spatial light modulator of claim 3, wherein the filling layer is in contact with a portion of the upper surface of the resonance layer located between the grating structures of the first group and the grating structures of the second group.

5. The spatial light modulator of claim 3, further comprising a dielectric layer provided between neighboring grating structures of the grating structures of the first group and having a heat transfer coefficient exceeding about 1000 mW/mK.

6. The spatial light modulator of claim 5, wherein the dielectric layer comprises at least one of a Si oxide or a Si nitride.

7. The spatial light modulator of claim 1, further comprising a cover layer provided on the filling layer and spaced apart from the second reflective layer in a direction in which the first reflective layer, the resonance layer, and the second reflective layer are stacked.

8. The spatial light modulator of claim 7, further comprising a spacer layer comprising two opposing ends,
wherein the two opposing ends comprise a first end in contact with the resonance layer and a second end in contact with the cover layer.

9. The spatial light modulator of claim 1, wherein at least one of the plurality of grating structures is any one of a PIN structure in which an intrinsic semiconductor layer is provided between a p-type semiconductor layer and an n-type semiconductor layer, a NIN structure in which an intrinsic semiconductor layer is provided two n-type semiconductor layers, and a PIP structure in which an intrinsic semiconductor layer is provided two p-type semiconductor layers.

10. The spatial light modulator of claim 1, wherein a pitch of each of the plurality of grating structures is less than a wavelength of light modulated by the spatial light modulator.

11. The spatial light modulator of claim 1, wherein a reflectivity of the second reflective layer is less than a reflectivity of the first reflective layer.

12. The spatial light modulator of claim 1, wherein the first reflective layer comprises a distributed Bragg reflective layer.

13. The spatial light modulator of claim 1, further comprising an etching stop layer provided between the resonance layer and the filling layer.

14. The spatial light modulator of claim 1, wherein a side mode suppression ratio (SMSR) of the spatial light modulator is about 5 dB or more.

15. The spatial light modulator of claim 1, wherein each of the plurality of grating structures comprises a p-type semiconductor layer corresponding to the first doped semiconductor layer, an n-type semiconductor layer corresponding to the second doped semiconductor layer, the intrinsic semiconductor layer disposed between the p-type semiconductor layer and the n-type semiconductor layer, and
wherein a region surrounding the p-type semiconductor layer, the n-type semiconductor layer, and the intrinsic semiconductor layer of each of the plurality of grating structures is in the vacuum state or filled with the air, and
wherein the plurality of grating structures are spaced apart from each other such that the p-type semiconductor layer, the n-type semiconductor layer, and the intrinsic semiconductor layer of the plurality of grating structures are arranged at uniform intervals.

16. A light detection and ranging (LiDAR) apparatus comprising:
- a light source configured to emit light;
- a spatial light modulator configured to control a traveling direction of the light emitted from the light source to cause the light to travel to an object; and
- a photodetector configured to detect the light reflected from the object,
- wherein the spatial light modulator comprises:
- a first reflective layer;
- a second reflective layer comprising a plurality of grating structures spaced apart from each other;
- a resonance layer provided between the first reflective layer and the second reflective layer; and
- a filling layer having a heat transfer coefficient of about 100 mW/mK or less and being in contact with an upper surface of the resonance layer and covering at least one grating structure of the plurality of grating structures, wherein the filling layer is in a vacuum state or filled with air, and
- wherein each of the plurality of grating structures comprises a first doped semiconductor layer, an intrinsic semiconductor layer, and a second doped semiconductor layer and has a polycrystalline structure.

17. The LiDAR apparatus of claim 16, further comprising
- a cover layer provided on the filling layer and spaced apart from the second reflective layer in a direction in which the first reflective layer, the resonance layer, and the second reflective layer are stacked; and
- a spacer layer comprising two opposing ends, wherein the two opposing ends comprise a first end in contact with the cover layer and a second end in contact with the resonance layer.

18. The LiDAR apparatus of claim 16, further comprising an etching stop layer provided between the resonance layer and the filling layer.

* * * * *